(No Model.)
S. M. GRAUMLICH.
CULTIVATOR SHOVEL.
No. 484,789. Patented Oct. 25, 1892.
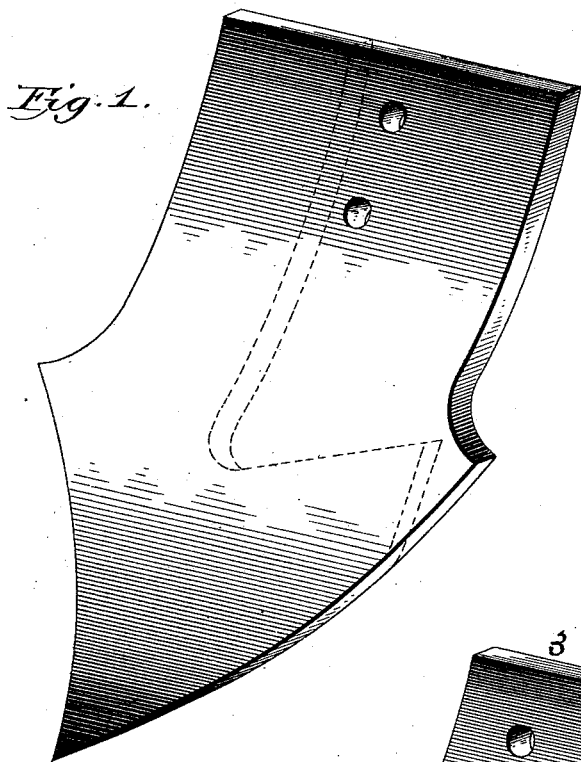
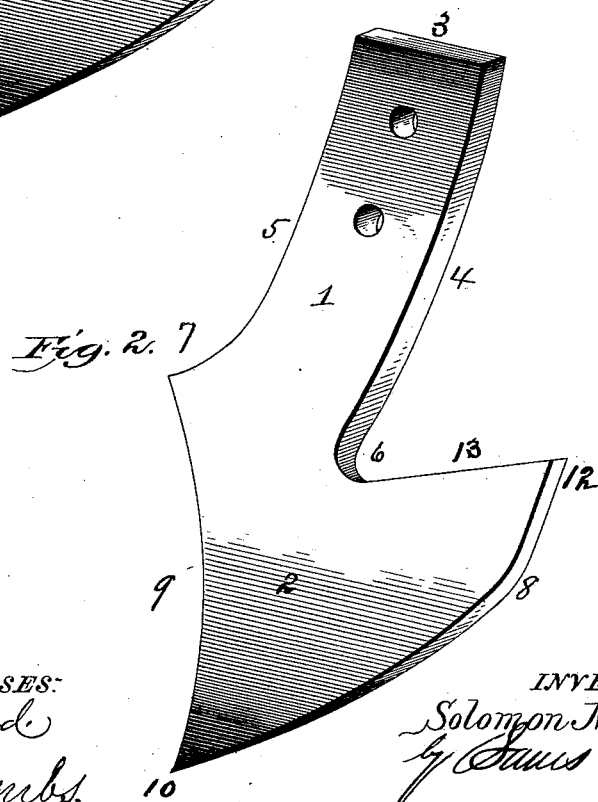
WITNESSES:
F. L. Ourand
Jo. L. Coombs
INVENTOR:
Solomon M. Graumlich
by James Sagger & Co.
Attorneys.

UNITED STATES PATENT OFFICE.

SOLOMON M. GRAUMLICH, OF DUVALL, OHIO.

CULTIVATOR-SHOVEL.

SPECIFICATION forming part of Letters Patent No. 484,789, dated October 25, 1892.

Application filed February 5, 1892. Serial No. 420,413. (No model.)

*To all whom it may concern:*

Be it known that I, SOLOMON M. GRAUMLICH, a citizen of the United States, and a resident of Duvall, in the county of Pickaway and State of Ohio, have invented certain new and useful Improvements in Cultivator-Shovels; and I do hereby declare that the following is a full, clear, and exact description of the invention, which will enable others skilled in the art to which it appertains to make and use the same, reference being had to the accompanying drawings, which form a part of this specification.

My invention relates to improvements in cultivator-shovels, the object being to provide an improved construction whereby I attain superior advantages over other articles of this description with respect to simplicity in construction and efficiency in operation.

The invention consists in the novel construction hereinafter fully described and claimed.

In the accompanying drawings, Figure 1 is a perspective view of an ordinary cultivator-shovel. Fig. 2 is a similar view of a shovel constructed in accordance with my invention.

In carrying my invention into effect I take a metal blank and by any suitable means form it into the shovel seen in Fig. 2, the same consisting of the shank 1 and body 2, the shank having straight upper edge 3, parallel sides 4 and 5, curved outwardly at 6 and 7, while the body has curved sides 8 and 9, forming a point 10 in line with the side 4 of the shank. By this construction an outwardly-projecting wing 12 is formed by the inclined edge 13, connecting side 9 of the body with side 4 of the shank. By referring to Figs. 1 and 2 the difference between my improved shovel and the shovel in general use will be apparent, the dotted line in Fig. 1 showing how the blank is cut away to form the shovel shown in Fig. 2. The shovel is secured to the plow-beam in the ordinary manner.

The improved shovel can also be applied to spring-tooth harrows by cutting off the lower ends of said teeth and riveting my shovel thereto.

By my improved construction the part of the shovel which is under ground is of comparatively large area—that is to say, has a large working surface—while the part above ground is smaller. The advantage of this construction is that too great a quantity of earth or dirt is not thrown upon the corn during operation. Besides, the wing of the shovel will lift up and loosen the earth next to the corn, thus destroying the hard ridge usually formed at that point.

Having thus described my invention, what I claim is—

A cultivator-shovel consisting of a shank and a body made integral or of a single piece of metal, the shank having parallel sides 4 and 5, curved outwardly at their lower ends, and the body having curved sides 8 and 9, converging to a point 10 in line with the side 4 of the shank, forming an outwardly-projecting wing 12, the side of the body and side of the shank being joined by the inclined edge, substantially as and for the purpose described.

In testimony that I claim the foregoing as my own I have hereunto affixed my signature in presence of two witnesses.

SOLOMON M. GRAUMLICH.

Witnesses:
G. G. BRINTLINGER,
C. E. SNYDER.